(12) United States Patent
Guyon et al.

(10) Patent No.: US 11,376,947 B2
(45) Date of Patent: Jul. 5, 2022

(54) VENTILATION DEVICE WITH A PLURALITY OF ZONES AND ASSOCIATED VEHICLE

(71) Applicant: Flex-N-Gate France, Audincourt (FR)

(72) Inventors: Cyrille Guyon, Nommay (FR); David Duquesnoy, Chalonvillars (FR)

(73) Assignee: FLEX-N-GATE FRANCE, Audincourt (FR)

( * ) Notice: Subject to any disclaimer, the term of this patent is extended or adjusted under 35 U.S.C. 154(b) by 97 days.

(21) Appl. No.: 16/886,047

(22) Filed: May 28, 2020

(65) Prior Publication Data
US 2020/0376951 A1    Dec. 3, 2020

(30) Foreign Application Priority Data

May 29, 2019    (FR) ...................................... 19 05710

(51) Int. Cl.
| | | |
|---|---|---|
| *B60K 11/00* | (2006.01) | |
| *B60K 11/08* | (2006.01) | |
| *B60R 19/18* | (2006.01) | |
| *B60R 19/44* | (2006.01) | |

(52) U.S. Cl.
CPC ............ *B60K 11/085* (2013.01); *B60R 19/18* (2013.01); *B60R 19/44* (2013.01); *B60R 2019/1886* (2013.01)

(58) Field of Classification Search
CPC ....... B60K 11/085; B60K 11/08; B60R 19/18; B60R 19/44
USPC ........................................................ 180/68.1
See application file for complete search history.

(56) References Cited

U.S. PATENT DOCUMENTS

| | | | | |
|---|---|---|---|---|
| 7,559,391 | B2 * | 7/2009 | Bradley | B60K 11/085 |
| | | | | 180/68.1 |
| 9,216,644 | B2 * | 12/2015 | Cardile | B60K 11/085 |
| 9,809,108 | B2 * | 11/2017 | Ribaldone | B60K 11/08 |
| 10,821,826 | B2 * | 11/2020 | Stenger | B60K 11/085 |
| 2006/0073781 | A1 * | 4/2006 | Mochizuki | F24F 13/15 |
| | | | | 454/152 |

(Continued)

FOREIGN PATENT DOCUMENTS

| | | |
|---|---|---|
| DE | 202011050523 U1 | 10/2011 |
| DE | 1020160219057 A1 | 4/2018 |

(Continued)

OTHER PUBLICATIONS

French Search Report, dated Feb. 11, 2020, from corresponding French application No. 1905710.

*Primary Examiner* — Hau V Phan
(74) *Attorney, Agent, or Firm* — Nixon & Vanderhye (57) ABSTRACT

Disclosed is a ventilation device for a vehicle including a frame defining an opening and a closing device of the opening. The ventilation device has a first zone. The closing device includes at least one main closing flap able to close off the first zone and able to rotate about a first axis of rotation extending along a single first direction of rotation. The ventilation device has at least one second zone. The closing device includes at least one secondary closing flap able to close off the second zone and able to rotate about a second axis of rotation extending along a single second direction of rotation for the or each second zone, the second direction of rotation being separate from the first direction of rotation.

10 Claims, 5 Drawing Sheets

(56) References Cited

U.S. PATENT DOCUMENTS

| | | | | |
|---|---|---|---|---|
| 2008/0142285 A1* | 6/2008 | McCurdy | ............... | F01P 5/06 |
| | | | | 180/68.1 |
| 2010/0282438 A1* | 11/2010 | Wirth | ............... | B60K 11/085 |
| | | | | 165/67 |
| 2017/0144533 A1* | 5/2017 | Gilotte | ............... | B60K 11/085 |
| 2018/0264933 A1* | 9/2018 | Laurent | ............... | B60K 11/085 |

FOREIGN PATENT DOCUMENTS

| | | |
|---|---|---|
| DE | 202017106531 U1 | 1/2019 |
| FR | 3022878 A1 | 1/2016 |
| JP | 2013-199178 A | 10/2013 |
| WO | 2018229402 A1 | 12/2018 |

\* cited by examiner

VENTILATION DEVICE WITH A PLURALITY OF ZONES AND ASSOCIATED VEHICLE

The present invention relates to a ventilation device for a vehicle comprising a frame defining an opening and a shutter device of the opening, the ventilation device having a first zone, the shutter device comprising at least one main closing flap able to close off the first zone, the at least one main closing flap being able to rotate about a first axis of rotation extending along a single first direction of rotation.

The present invention further relates to a vehicle comprising such a ventilation device.

The invention more specifically relates to a ventilation device configured to manage air flows of a motor vehicle. This system may advantageously be used to manage the temperature of the engine of the vehicle.

Such a ventilation device is for example arranged at the front of the vehicle. The ventilation device makes it possible to manage an incoming air flow configured to be in contact with the radiator and making it possible to keep the engine at the optimal operating temperature. This known device advantageously makes it possible to combine an effective aerodynamic shape of the vehicle and an adjustment of the operating temperature of the engine.

However, such systems are not compatible with integration on a bumper skin or a grid having one or several curves.

One aim of the invention is to propose a ventilation device for a vehicle that is compatible with integration on a bumper skin or a grid having one or several curves.

To that end, the invention relates to a ventilation device of the aforementioned type, wherein the ventilation device has at least one second zone, the shutter device comprising at least one secondary closing flap able to close off the second zone, the at least one secondary closing flap being able to rotate about a second axis of rotation extending along a single second direction of rotation for the or each second zone, the second direction of rotation being different from the first direction of rotation.

Such a ventilation device is able to be integrated more easily on a bumper skin or a grid having one or several curves, the different zones being able to be arranged so as to respect the curve(s).

Furthermore, such a device makes it possible to manage airflows in different directions, and thus allows improved management of the temperature of the engine and/or elements other than the engine.

The ventilation device may further have one or more of the features below, considered individually or according to any technical possible combination(s):
- the first zone is a central zone, the ventilation device having two second zones, the two second zones being side zones located on either side of the central zone in a transverse direction;
- the rotation of the at least one secondary closing flap able to close off a first of the side zones can be actuated independently of the rotation of the at least one secondary closing flap able to close off a second of the side zones;
- the ventilation device has a median plane of symmetry perpendicular to a transverse direction;
- the first direction of rotation is parallel to a transverse direction to within 5°;
- the norm of the component in an elevation direction of a vector of the second direction of rotation is strictly greater than the norm of each of the components of the vector in directions orthogonal to the elevation direction, more specifically strictly greater than the norm of the addition of the components of the vector in the directions orthogonal to the elevation direction;
- the rotation of the at least one main closing flap is controlled by at least one first actuating system, the rotation of the at least one secondary closing flap being controlled by at least one second actuating system; and/or
- the at least one main closing flap is curved and/or the at least one secondary closing flap is curved.

The invention further relates to a vehicle comprising a ventilation device as previously defined.

In one specific embodiment, the vehicle has the following feature: the ventilation device defines an outer surface of the vehicle, the outer surface being visible from the outside of the vehicle.

Other features and advantages of the invention will emerge from the detailed description thereof provided below, for information and non-limitingly, in reference to the appended figures, in which.

A front part 10 of a vehicle according to a first embodiment is shown in FIGS. 1 to 4.

The transverse direction Y is defined as the extension direction of each of the axles of the vehicle, the elevation direction Z is defined as the direction perpendicular to the rolling plane of the vehicle, and the longitudinal direction X is defined as the direction perpendicular to the transverse Y and elevation Z directions.

"Front", "rear" and "left", "right" and "lower", "upper" are defined according to the usual terms for a vehicle respectively in the longitudinal X, transverse Y and elevation Z directions.

The front part 10 has an outer face 12 that is visible from the outside of the vehicle and a rear face 14.

The front part 10 comprises a ventilation device 16.

The ventilation device 16 is for example configured to be part of a grid or bumper skin of a vehicle in order to allow an intake of outside air to cool a cooling device of the vehicle through an air inlet opening.

The ventilation device 16 has a median plane P of symmetry perpendicular to the transverse direction Y.

The ventilating device 16 comprises a frame 18 and a shutter device 20.

The frame 18 defines an opening 22. The opening 22 allows air to enter the vehicle.

The opening 22 has a lower edge, an upper edge and two side edges. Each side edge couples the lower edge and the upper edge at a respective end of the opening 22 in the transverse direction Y.

The frame 18 is for example curved at the opening 22. More specifically, the lower edge and the upper edge of the opening 22 extend substantially in the transverse direction Y in a central portion and are curved in the longitudinal direction X at each of their ends.

According to the illustrated embodiment, the frame 18 is formed by the bumper.

Thus, the opening 22 is for example formed in a bumper skin of the vehicle.

In a variant, the frame 18 is formed by a module of the vehicle and/or by a part configured to be mounted on the vehicle.

The ventilation device 16 here further comprises a carcass 24.

The carcass 24 comprises a perimeter and a grid 26. The perimeter has a shape similar to the frame and attached to the frame or forms the frame 18. The grid 26 in particular makes it possible to improve the visual appearance through a specific stylistic effect, for example by painting the grid, and/or to prevent the intrusion of objects such as stones into the compartment behind, here the engine compartment.

The grid 26 extends into the space defined by the opening 22.

The carcass 24, more specifically the grid 26, comprises two interface rods 27, more specifically an interface rod on each side of the median plane P.

Each interface rod 27 couples the lower edge and the upper edge of the opening 22.

The ventilation device 16 has a first zone 28 and at least one second zone 30, 32.

In the illustrated example, the ventilation device 16 has a first zone 28 called central zone, and two second zones 30, 32 called side zones.

The central zone 28 extends at the center of the ventilation device 16 in the transverse direction Y. In particular, the median plane P intersects the central zone 28.

The central zone 28 extends between each of the interface rods 27, the lower edge and the upper edge of the opening 22.

The two second zones 30, 32 are located on either side of the central zone 28 in the transverse direction Y.

Each of the side zones extends between the lower edge and the upper edge of the opening 22, one of the interface rods 27 and a side edge of the opening 22.

The shutter device 20 is able to close off the opening 22, more specifically the entire surface of the opening 22.

The shutter device 20 comprises at least one main closing flap 34, here more specifically a single main closing flap, able to close off the central zone 28, and at least one secondary closing flap 36 able to close off the each second zone 30, 32.

In the illustrated example, the at least one main closing flap 34 is curved, so as to follow the curvature of the frame 18.

More specifically, the main closing flap 34 comprises a central portion and side portions located on either side of the central portion in the transverse direction Y. In the central portion, the flap extends substantially in the transverse direction Y; more specifically, the flap has a greater curve radius than in the side zones. In each side portion, the flap has a smaller curve radius than in the central zone, such that the side portions are more curved than the central portion.

The main closing flap 34 is able to rotate about a first axis of rotation A extending in a first direction of rotation, more specifically between a closed position and at least one open position.

Here, the first direction of rotation is parallel to the transverse direction Y to within 5°, more specifically is parallel to the transverse direction Y.

If there are multiple main closing flaps, each main closing flap is able to rotate about a first respective axis of rotation, all of the respective first axes of rotation being parallel to one another.

Figure 2:
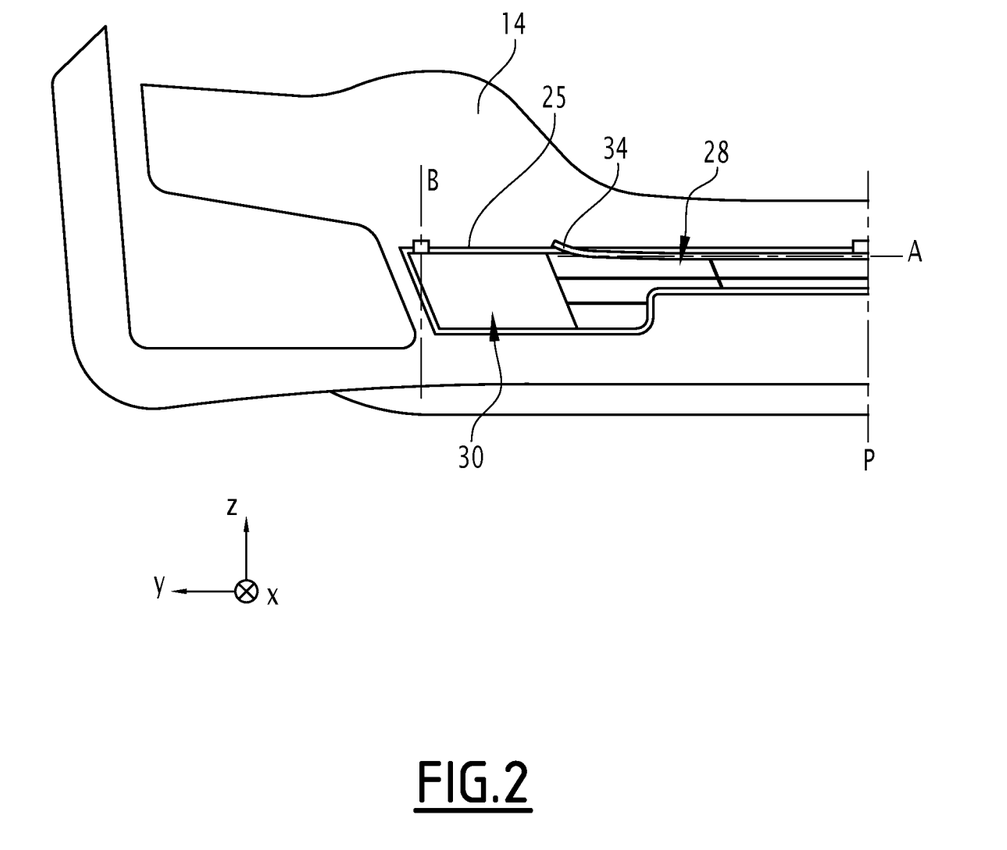
FIG. 2 is a schematic view of half of the rear face of the front part of FIG. 1, the primary closing flap being open and the secondary closing flap being closed.
Figure 3:
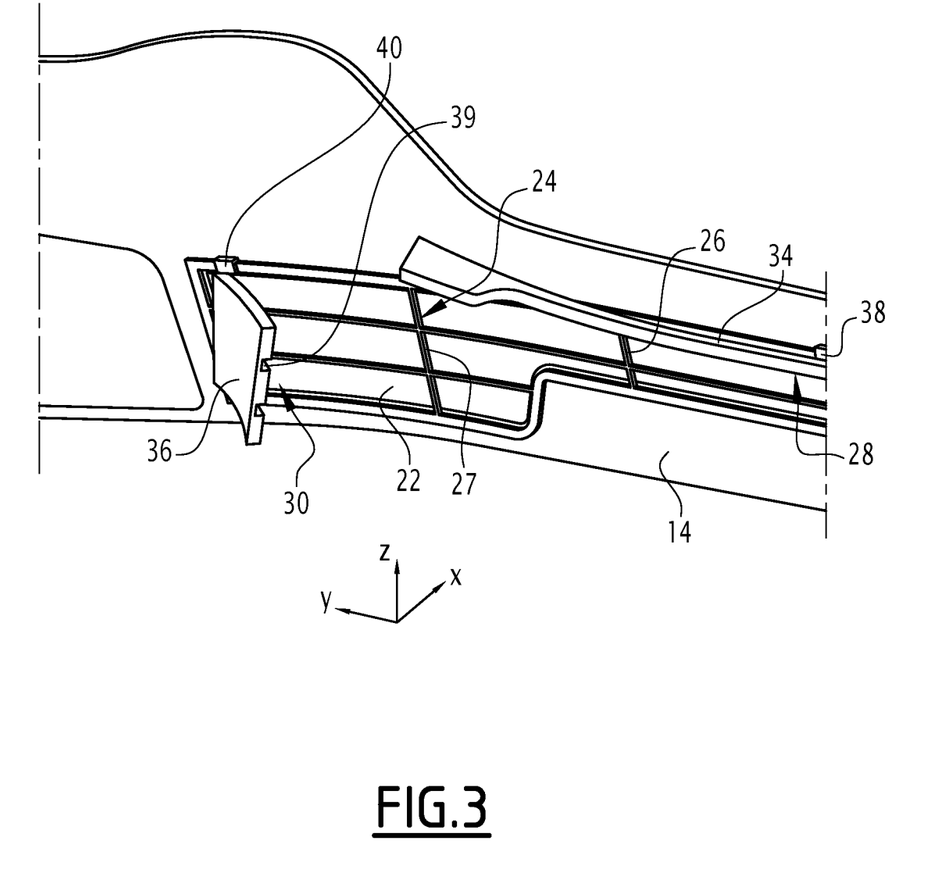
FIG. 3 is a schematic perspective view of half of the rear face of the front part of FIG. 1, the primary and secondary closing flaps being open.

In the open position visible in FIGS. 2 and 3, the opening 22 is at least partially open in the central zone 28, such that an air flow can circulate through the central zone 28 of the opening 22.

The air flow is in particular useful in regulating the temperature of the powertrain in particular comprising the heat engine and/or the hybridization battery.

More specifically, in the open position, the opening 22 here is completely open in the central zone 28, that is to say, the main closing flap(s) do not extend across from the central zone 28 of the opening 22 in the longitudinal direction X.

In the open position, the main closing flap(s) can serve as air guide and/or convergent nozzle.

Figure 1:
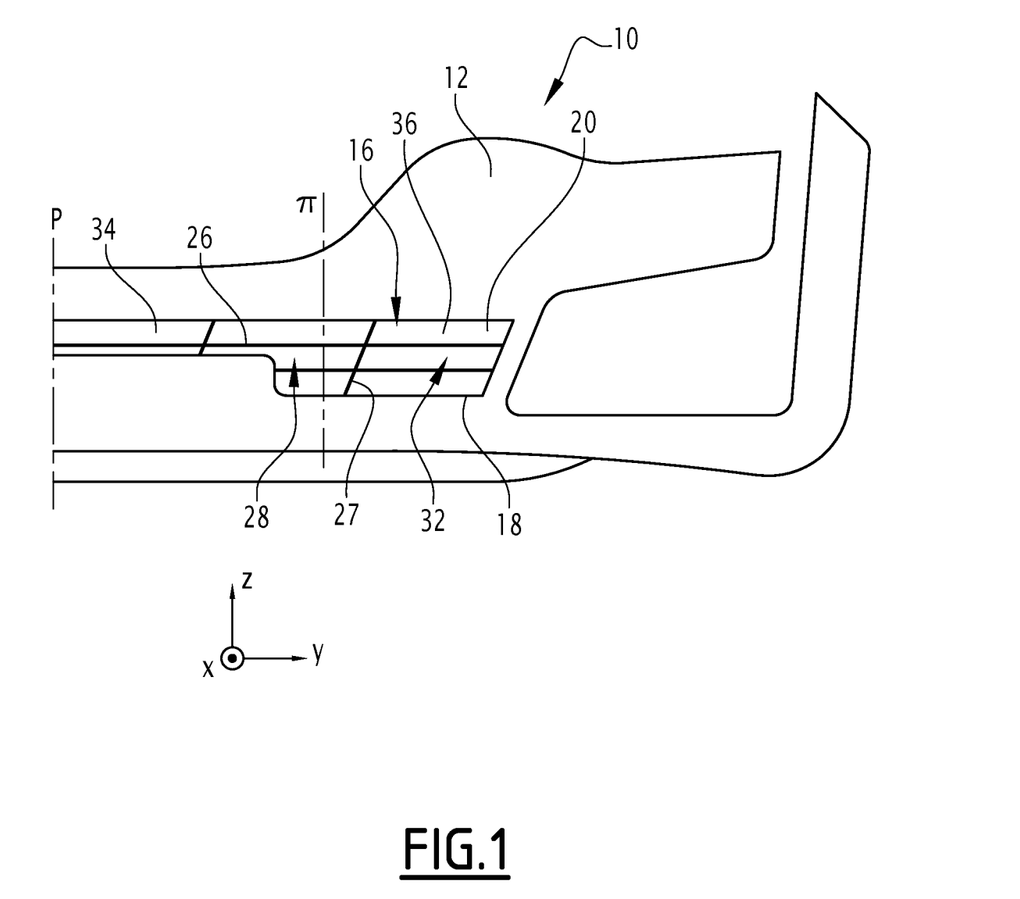
FIG. 1 is a schematic view of half of the front face of a front part of a vehicle according to a first embodiment of the invention, the primary and secondary closing flaps being closed.

In the closing position visible in FIG. 1, the main closing flap or the set of main closing flap(s) closes off the entire central zone 28, that is to say, here the zone between each of the interface rods 27, the lower edge and the upper edge of the opening 22.

The main closing flap(s) extend in the planar or curved space defined by the opening in the central zone 28.

Figure 4:
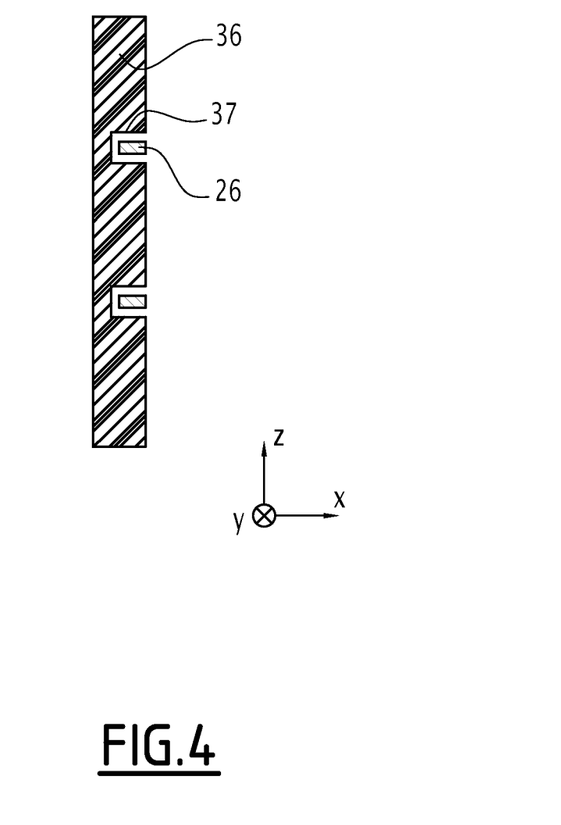
FIG. 4 is a sectional view along plane π of the primary closing flap and the grid of the front part of FIG. 1.

The main closing flap(s) 34 have hollow elements 37 that are complementary to the grid 26 in the central zone 28, such that in the closed position of the main closing flap(s), the grid extends in the hollow elements 37, as shown in FIG. 4.

The grid 26 then allows the docking of the main closing flap(s) in the closed position.

In the closed position, a face of the main closing flap is oriented against the direction of the air flow. This advantageously makes it possible to improve the drag coefficient Cx of the vehicle in the closed position.

Alternatively, in the closed position, the main closing flap or the set of main closing flaps only partially closes off the entire central zone 28, that is to say, an air flow can circulate through the central zone 28 of the opening 22, but the ventilation device has an air passage surface in the central zone 28 that is strictly smaller than the air passage surface in the central zone 28 in the open position.

A rotation angle of the main closing flap 34 is defined between the open position and the closed position about the first axis of rotation A.

For example, the rotation angle is substantially equal to 90°.

For example, the main closing flap 34 is made from a polymer.

In a variant, the main closing flap 34 is made from metal.

The shutter device here further comprises a first actuating system 38 provided to control the rotation of the main closing flap 34.

In an embodiment in which the shutter device comprises several main closing flaps, the first actuating system for example controls one of the main closing flaps, the other main closing flaps being driven by said main closing flap by connection elements coupling the main closing flaps to one another. Alternatively, each main closing flap is controlled by a first respective actuating system.

The shutter device 34 here comprises a single secondary closing flap 36 per second zone. Each secondary closing flap 36 is able to close off the corresponding second zone, here one of the side zones 30, 32.

The secondary closing flap(s) 36 of a second zone have a shape complementary to said second zone 30, 32.

The secondary closing flap 36 is, for example, curved. More specifically, the secondary closing flap 36 has a curvature similar to that of the opening 22 in the second corresponding zone 30, 32.

Each secondary closing flap 36 is able to rotate about a second respective axis of rotation B, more specifically between a closed position and at least one open position.

For each second zone 30, 32, if there are multiple secondary closing flaps in said second zone, the second respective axes of rotation B are parallel to one another and extend in a single second direction of rotation for each second zone.

For each second zone 30, 32, if there is a single second closing flap in said second zone, the second axis of rotation B extends in a second direction of rotation.

The second direction of rotation of each second zone 30, 32 is different from the first direction of rotation.

More specifically, each second direction of rotation forms, with the first direction of rotation, an angle greater than or equal to 30°.

The second directions of rotation of the different second zones 30, 32 are not necessarily identical to one another.

In the illustrated embodiment, the second directions of rotation of the side zones 30, 32 are symmetrical to one another relative to the median plane P.

For each second zone, the norm of the component in an elevation direction Z of a vector of the second direction of rotation is strictly greater than the norm of each of the components of the vector in longitudinal X and transverse Y directions, more specifically strictly greater than the norm of the addition of the components of the vector in the longitudinal X and transverse Y directions.

Each second direction of rotation forms, with the transverse direction Y, an angle greater than or equal to 30°.

In the illustrated example, the second axis of rotation B of the secondary closing flap 36 is arranged near the side edge of the corresponding side zone 30, 32.

More specifically, the second axis of rotation B extends less than 40 mm in the transverse direction Y from the point of the corresponding side zone 30, 32 furthest from the median plane P in the transverse direction Y.

In the open position of the secondary closing flap(s) 36 of a side zone 30 as visible in FIG. 3, the opening 22 is at least partially open in the side zone 30, such that an air flow can circulate through the side zone 30 of the opening 22.

In the embodiment illustrated in FIG. 3, the air flow of each of the side zones 30, 32 converges toward the air flow of the central zone 28. The air flow of the side zones 30, 32 is, for example, also oriented toward the cooling system of the engine.

The secondary closing flap 36 here serves as convergent nozzle to channel the air flow into the cooling zone of the powertrain.

In the closed position of the secondary closing flap(s) 36 of a side zone 30, 32 as shown in FIGS. 1 and 2, the secondary closing flap or the set of secondary closing flaps 36 closes off the entire side zone 30, 32, that is to say, here, between one of the interface rods 27, one of the side edges, the lower edge and the upper edge of the opening 22.

The secondary closing flap(s) 36 extend in the planar or curved space defined by the opening in the corresponding side zone 30, 32.

The secondary closing flap(s) have hollow elements 39 that are complementary to the grid 26 in the corresponding side zone 30, 32, such that in the closed position of the secondary closing flap(s), the grid 26 extends in the hollow elements 39.

The grid 26 then allows the docking of the secondary closing flap(s) in the closed position.

In the closed position, a face of the secondary closing flap is oriented against the direction of the air flow. This advantageously makes it possible to improve the drag coefficient Cx of the vehicle in the closed position.

Alternatively, in the closed position, the secondary closing flap or the set of secondary closing flaps only partially closes off the entire corresponding side zone 30, 32, that is to say, an air flow can circulate through the side zone 30, 32, but the ventilation device has an air passage surface in the corresponding side zone 30, 32 that is strictly smaller than the air passage surface in the corresponding side zone 30, 32 in the open position.

A rotation angle of the secondary closing flap 36 is defined between the open position and the closed position about the second axis of rotation B.

For example, the rotation angle is substantially equal to 90°.

The rotation of the at least one secondary closing flap 36 of a first of the second zones 30, 32 can be actuated independently of the rotation of the at least one secondary closing flap 36 of a second of the second zones 30, 32, and vice versa.

In the illustrated example, this in particular means that the at least one secondary closing flap 36 of a first of the side zones 30, 32 is able to be in the closed position, while the at least one secondary closing flap 36 of the second of the side zones 30, 32 is in the open position.

Alternatively, the rotation of the secondary closing flaps 36 of the side zones 30, 32 is synchronized, such that the secondary closing flaps 36 of the side zones 30, 32 extend symmetrically relative to one another with respect to the median plane P.

The secondary closing flap 36 is, for example, made from a polymer.

In a variant, the secondary closing flap 36 is made from metal.

The shutter device here advantageously comprises at least one second actuating system 40 provided to control the rotation of one or more secondary closing flaps 36.

In the illustrated embodiment, the shutter device comprises a single second actuating system 40 per second zone 30, 32 provided to control the rotation of the single secondary closing flap 36 of said second zone 30, 32.

In an embodiment in which the shutter device comprises several secondary closing flaps in a second zone, the second actuating system for example controls one of the secondary closing flaps of said second zone, the other secondary closing flaps of said second zone being driven by said secondary closing flap by connection elements coupling the secondary closing flaps to one another. Alternatively, each secondary closing flap is controlled by a second respective actuating system.

In their respective closed positions, the main and secondary closing flaps define an outer surface of the shutter device, also called "outer skin". The outer skin for example extends in the continuity of the outer surface of the part of the vehicle on which the shutter device is mounted so as to offer a satisfactory esthetic of the shutter device and its environment.

Figure 5:
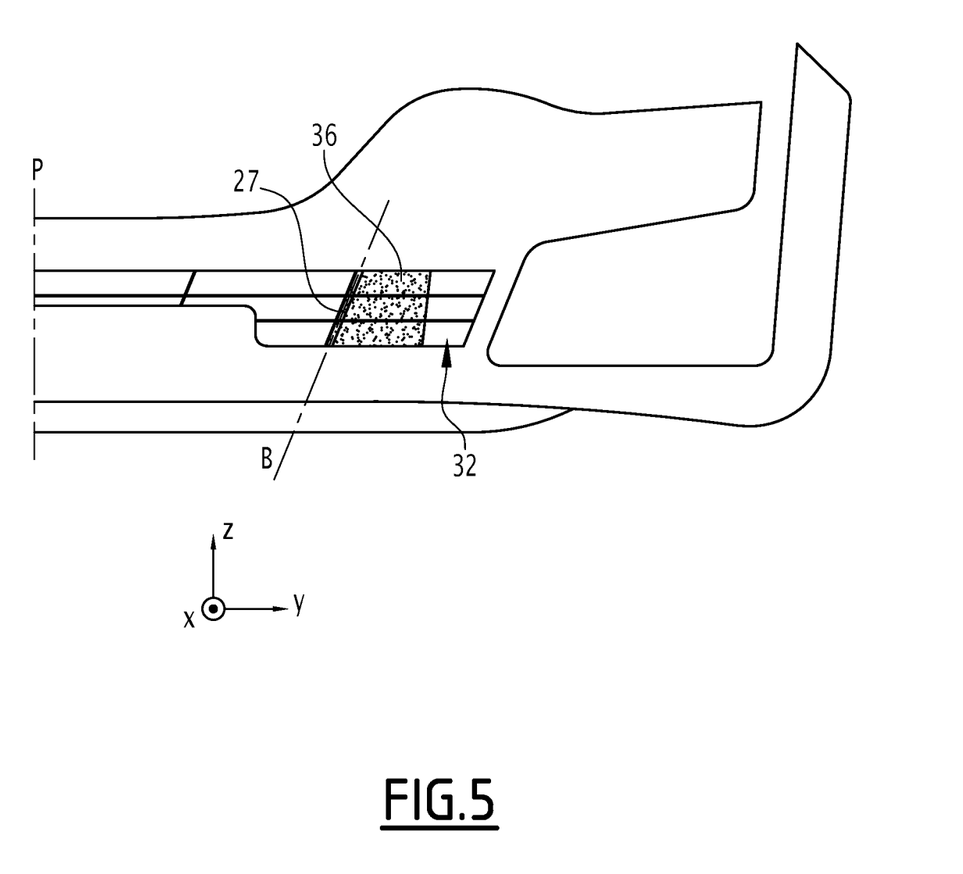
FIG. 5 is a schematic view of half of the front face of a front part of a vehicle according to a second embodiment, the primary and secondary closing flaps being open.

A second embodiment of the invention is shown in FIG. 5.

Only the features by which this embodiment differs from the first embodiment will be described here.

Identical or similar elements bear numerical references corresponding to the references of the first embodiment.

The second embodiment differs only in the position of the second axis of rotation B of the secondary closing flap 36 for each of the side zones 30, 32.

For each side zone 30, 32, the second axis of rotation B extends parallel to the interface rod 27 of the corresponding side zone.

The second axis of rotation B extends less than 5 centimeters, preferably less than 40 mm, in the transverse direction Y from the corresponding interface rod 27.

The second directions of rotation of the side zones 30, 32 are symmetrical to one another relative to the median plane P.

In the open position, the air flow of each of the side zones 30, 32 diverges relative to the air flow of the central zone 28 in the transverse direction Y. The air flow of the side zones 30, 32 is, for example, oriented toward the air conditioning system, the braking system and/or the traction battery cooling system, so as to participate in the thermal regulation of these systems.

Such a configuration therefore further allows a thermal regulation of elements other than an engine located at the rear of the central zone 28 in the longitudinal direction X by orienting the air flow of the side zones 30, 32 in a divergent manner.

In a first variant that is not shown, the ventilation device comprises two central zones located on either side of the median plane P. They are for example symmetrical relative to one another along the median plane P.

In one embodiment, the first direction of rotation of one of the central zones is collinear to the first direction of rotation of the other of the central zones. More specifically, the first direction of rotation of each of the central zones substantially corresponds to the transverse direction Y.

Alternatively, the first direction of rotation of one of the central zones is not collinear to the first direction of rotation of the other of the central zones. The first directions of rotation of each of the central zones are symmetrical to one another relative to the median plane P.

In a second variant that is not shown, for each second zone, the norm of the component in the transverse direction Y of a vector of the second direction of rotation is strictly greater than the norm of each of the components of the vector in longitudinal X and elevation Z directions, more specifically strictly greater than the norm of the addition of the components of the vector in the longitudinal X and elevation Z directions.

Each second direction of rotation forms, with the transverse direction Y, an angle greater than or equal to 30°.

A ventilation device according to the invention therefore makes it possible to provide arrangements of the different zones so as to respect the curvature of a bumper skin or a grid having a curvature. This therefore makes it possible to integrate said ventilation device into the bumper skin or the grid.

This further offers an esthetically satisfactory appearance from the outside of the vehicle.

Furthermore, such a device makes it possible to manage airflows in different directions, and thus allows improved management of the temperature of the engine and/or elements other than the engine.

The invention claimed is:

1. A ventilation device for a vehicle, the ventilation device comprising a frame defining an opening and a shutter device of the opening, the ventilation device having a first zone, the shutter device comprising at least one main closing flap able to close off the first zone, the at least one main closing flap being able to rotate about a first axis of rotation extending along a single first direction of rotation,
    wherein the ventilation device has at least one second zone, the shutter device comprising at least one secondary closing flap able to close off the second zone, the at least one secondary closing flap being able to rotate about a second axis of rotation extending along a single second direction of rotation for the or each second zone, the second direction of rotation being different from the first direction of rotation, and
    wherein the first zone is a central zone, the ventilation device having two second zones, the two second zones being side zones located on either side of the central zone in a transverse direction.

2. The ventilation device according to claim 1, wherein the rotation of the at least one secondary closing flap able to close off a first of the side zones can be actuated independently of the rotation of the at least one secondary closing flap able to close off a second of the side zones.

3. The ventilation device according to claim 1, having a median plane of symmetry perpendicular to a transverse direction.

4. The ventilation device according to claim 1, wherein the first direction of rotation is parallel to a transverse direction to within 5°.

5. The ventilation device according to claim 1, wherein a vector of the second direction of rotation comprises a component in an elevation direction and components in directions orthogonal to the elevation direction, a norm of the component in the elevation direction being strictly greater than a norm of each of the components of the vector in the directions orthogonal to the elevation direction, the norm of each component being a size of each component in a (X, Y, Z) frame of reference.

6. The ventilation device according to claim 5, wherein the norm of the component in the elevation direction of the vector of the second direction of rotation is strictly greater than the norm of the addition of the components of the vector in the directions orthogonal to the elevation direction.

7. The ventilation direction according to claim 1, wherein the rotation of the at least one main closing flap is controlled by at least one first actuating system, the rotation of the at least one secondary closing flap being controlled by at least one second actuating system.

8. The ventilation device according to claim 1, wherein the at least one main closing flap is curved and/or the at least one secondary closing flap is curved.

9. A vehicle comprising the ventilation device according to claim 1.

10. The vehicle according to claim 9, wherein the ventilation device defines an outer surface of the vehicle, the outer surface being visible from the outside of the vehicle.

* * * * *